United States Patent [19]
Smallegan

[11] 3,945,564
[45] Mar. 23, 1976

[54] TEMPERATURE CONTROL SYSTEM

[75] Inventor: Jon Smallegan, Ann Arbor, Mich.

[73] Assignee: Novo Products, Inc., Farmington, Mich.

[22] Filed: June 24, 1974

[21] Appl. No.: 482,448

[52] U.S. Cl. ............ 236/46 E; 236/68 B; 219/511; 236/51
[51] Int. Cl.² .......................................... G05D 23/30
[58] Field of Search ....... 236/46, 68 B, 51; 337/377, 337/304; 219/511; 62/202

[56] References Cited
UNITED STATES PATENTS

| | | | |
|---|---|---|---|
| 2,136,753 | 11/1938 | Penn | 236/46 |
| 3,599,863 | 8/1971 | Pinckaers | 236/46 |
| 3,799,433 | 3/1974 | Bauer et al. | 236/68 B |

*Primary Examiner*—William E. Wayner
*Attorney, Agent, or Firm*—Harness, Dickey & Pierce

[57] ABSTRACT

A temperature control system for providing an automatic reduction in the temperature of a room or a house during the nighttime hours which requires only the conventional two conductor wiring between the furnace and the thermostat thereby avoiding the necessity of adding to or replacing the existing wiring between the furnace and the thermostat. The system includes a temperature responsive element, a heater near the temperature responsive element for providing supplemental heating of the element, a conventional furnace control, a clock-operated current control for the heater, and a diode steering circuit for directing one portion of an alternating current waveform through the heater current control and the heater, and another portion of the alternating current waveform through the temperature responsive element and the furnace control for providing independent control of the heater and the furnace control. The heater provides supplementary heating of the temperature responsive element during the nighttime hours to establish an apparent room temperature which is higher than the actual room temperature so that the thermostat element will lower the room temperature during the nighttime hours.

19 Claims, 1 Drawing Figure

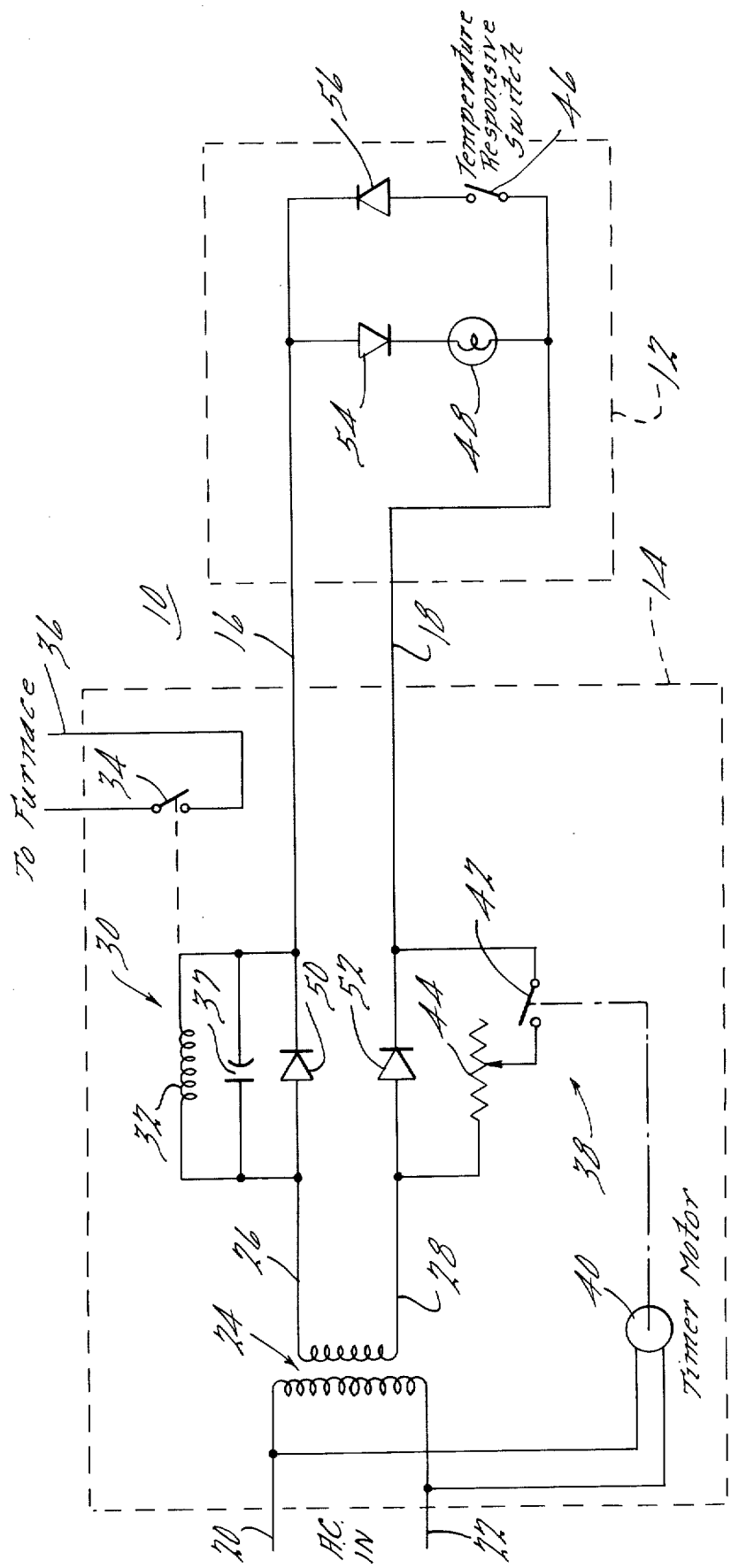

3,945,564

TEMPERATURE CONTROL SYSTEM

BACKGROUND AND SUMMARY OF THE INVENTION

The present invention relates to a system for automatically lowering the temperature of a room or a house during certain periods such as the nighttime hours utilizing the conventional two-conductor wiring from the furnace to the thermostat control. In this regard, it will be appreciated that in veiw of the national need to conserve energy, it is highly recommended that home temperatures be lowered every evening. As a practical matter, home owners will be less likely to effect a nightly temperature reduction if he must remember to adjust the thermostat each night and must arise to a cold house each morning and then readjust the thermostat. Consequently, the advantages of an automatic system for reducing the temperature setting of the thermostat each night and for increasing the temperature setting just prior to the usual awakening time are apparent.

It will be appreciated that if the installation of an automatic system requires the trouble and expense of replacing or supplementing the existing wiring from the thermostat to the furnace or the automatic system is costly, home owners will be discouraged rather than encouraged to save energy through the installation of an automatic temperature reduction system.

The present invention provides an automatic temperature reduction system for a room or house which is straightforward in construction so that it may be manufactured at low cost, and additionally, utilize the two existing conductors of the conventional thermostat wiring. The present invention achieves these advantageous results by providing a temperature control system utilizing a heat source which is associated with the temperature responsive element in the heated area and which is activated during the nighttime hours to make the apparent room temperature appear to be higher than the actual room temperature thereby causing the temperature responsive element to signal for a reduction in room temperature. A clock-controlled adjustable current source for the heater is located near the usual furnace control. Steering circuitry such as a first pair of diodes at the furnace control and heater current source location and a second pair of diodes at the temperature responsive element and heater location is provided for directing one-half of an alternating current waveform through the furnace control and the temperature responsive element, and the other half of the alternating current waveform through the heater current source and the heater so that the furnace temperature control can be independently controlled by the temperature responsive element and the heater can be independently controlled by the heater current source by using respective halves of the waveform for each control function.

BRIEF DESCRIPTION OF THE DRAWING

The figure is a schematic illustration of a temperature control system according to the present invention.

DETAILED DESCRIPTION OF THE PREFERRED EMBODIMENT

In the figure, a temperature control system 10 is illustrated which includes a first unit or system portion 12 which is located in the room or area in which the temperature is to be controlled, and a second unit or system portion 14 which is located proximate the furnace. The units 12 and 14 are connected by a single pair of conductors 16 and 18 which may be the pre-existing wiring from a conventional home thermostat unit. The unit 14 receives standard alternating current energy of 110–120 volts on conductors 20 and 22.

The unit 14 includes a step-down transformer 24 which converts the 110–120 volt alternating current energy to approximately 24 volts of alternating current energy across conductors 26 and 28. The unit 14 further includes a temperature control relay or solenoid switch 30 having a relay coil 32 and relay contacts 34 which are connected in series with a furnace control conductor 36 which in turn is connected to a conventional furnace control so that the furnace is turned on to supply heat to the heated area upon powering of the relay 30 which closes relay contacts 34. A spike suppression capacitor 37 is connected across the relay coil 32. The unit 14 still further includes a heater control unit 38 which consists of a timer motor 40, which controls timer contacts 42, and a variable resistor 44.

The unit 12 includes a thermostat switch 46 such as a conventional bimetal element which is adapted to bend in one direction on cooling to a preset temperature to close the switch and to bend in the other direction on heating to a somewhat higher temperature. The unit 12 further includes a heating unit 48 which may be an incandescent lamp bulb or the like. The heater 48 is in thermal transfer relationship with the thermostatic switch 46 so that the thermostatic switch 46 is heated by the heater 48 to make the room temperature or house temperature appear higher when the heater 48 is operated.

Each of the relay coil 32, the variable resistor 44, and the timer controlled contacts 42, the heater control unit 38, the heater 48, and the thermostatic switch 46 are connected to the two conductors 16 and 18 and the alternating current source on conductors 26 and 28 by a steering circuit which includes diodes 50, 52, 54 and 56. More particularly, the diode 50 is connected in parallel with the relay 32 and the spike suppression capacitor 37 and is connected in series with the supply line 26 and the conductor 16. The diode 52 is connected in parallel with a series connection of the variable resistor 44 and the timer controlled switch 42, and in series with the supply conductor 28 and the conductor 18. The diode 54 is connected in series with the heater 48, and across the existing conductors 16 and 18 so that it is in parallel with the temperature responsive switch 46. The diode 56 is connected in series with the temperature responsive switch 46, and across the conductors 16 and 18 so that it is in parallel with the heater 48.

In view of the above connection of the diodes, it will be appreciated that the positive-going portion of the potential waveform on supply line 26 provides a current which flows through diode 50, diode 54, heater 48, timer controlled contacts 42, and the variable resistor 44 to the other supply line 28. Negligible current flows through the temperature controlled relay coil 32 since the voltage drop across the forward-biased diode 50 is very small, and no current flows through the thermostatic switch 46 since the diode 56 is reversed biased.

When a positive-going portion of the potential waveform appears on the supply line 28, a current flows through the diode 52, the thermostatic switch 46, the diode 56, and the temperature controlled relay coil 32 to the other supply line 26. Negligible current flows through the adjustable resistor 44 and the timer controlled switch 42 since the voltage drop across the forward-biased diode 52 is very small, and no current flows through the heater 48 since the diode 54 is back biased.

In view of the above, it will be appreciated that the time-varying, alternating current voltage waveform provided by the step-down transformer 24 on lines 26 and 28 is divided into two time displaced portions, with one portion being directed through the circuit including the thermostatic switch 46 and the temperature controlled relay 32 and the other portion being directed through the heater 48, the timer controlled switch 42, and the heater control variable resistor 44. As a result, the furnace and the heater 48 can be independently controlled.

In operation, the user sets the thermostatic switch 46 for the appropriate daytime room temperature. As explained above, the thermostatic switch 46 operates in conjunction with the temperature control unit 30 to control the operation of the furnace through the opening and closing of the furnace control switch 34. The user also sets the timer motor so that the switch 42 is closed during the nighttime hours and sets the variable resistor 44 to establish the number of degrees of reduction of the nighttime temperature in the heated area. Preferably, the variable resistor is calibrated in degrees. For example, the calibration can be between 0° and 20° reduction in nighttime temperature with increasing resistance establishing a decreasing number of degrees of reduction of the nighttime temperature and infinite resistance, i.e an open at the resistor 44, providing no reduction in nighttime temperature. If desired, a switch may be placed in series with the variable resistor 44 to provide a means for overriding the automatic nighttime temperature reduction.

During the periods in which the timer controlled switch 42 is closed, current will flow through the heater 48 in an amount determined by the setting of the variable resistor 44 to cause supplemental heating of the temperature responsive switch 46. The supplemental heating of the temperature responsive switch 46 makes the apparent temperature of the heated area to appear higher than the actual temperature. Accordingly, the temperature responsive switch 46 will react to cause a decrease in the actual temperature of the heated area in accordance with the amount of heating of the temperature responsive switch 46 by the heater 48, and accordingly, in accordance with the amount of current flowing through the heater 48 as established by the setting of the variable resistor 44. The closing and opening of the temperature responsive switch 46 is responsible for the closing and opening of the relay switch 34 so as to turn the furnace on whenever the temperature falls below the set temperature and turn the furnace off when the temperature rises above a temperature slightly above the set temperature.

In view of the above description of the temperature control system accordiing to the present invention, it will be appreciated that the system of this invention uses few components and that the components used are available at low cost. Consequently, the system can be constructed at low cost. Importantly, the system is adapted to utilize the existing two conductors in the wiring system of conventional thermostats so that the temperature control system according to the present invention may be easily installed at low cost.

It is to be understood that the foregoing description is that of the preferred embodiment of the invention. Various changes and modifications may be made without departing from the spirit and scope of the invention as defined by the appended claims.

What is claimed is:

1. A system for controlling temperature at a first location from a remotely located second location utilizing a source of time varying electrical energy which alternates between two directions of current flow and two conductors extending from said first location to said second location comprising:

a first system portion located at said first location including temperature responsive means for responding to the temperature at said first location and a heat source in heat transfer relationship with said temperature responsive means for heating said temperature responsive means;

a second system portion located at said second location including control means for said heat source and a temperature control means for controlling the temperature at said first location; and steering circuitry means for receiving said time varying electrical energy and for connecting said heat source control means to said heat source and said temperature responsive means to said temperature control means only through said two conductors, said steering circuitry means providing a first time period of said time varying electrical energy exclusively to said heat source control means and said heat source and a second time period of said time varying electrical energy exclusively to said temperature control means and said temperature responsive means for providing independent control of said heat source by said heat source control means and said temperature control means by said temperature responsive means.

2. A system according to claim 1 wherein said time varying electrical energy is characterized by current which alternates between two directions of current flow and wherein said steering circuitry means includes means for directing current in one direction through said heat source control means and said heat source and for directing current in the other direction through said temperature control means and said temperature responsive means.

3. A system according to claim 2 wherein said means for directing said current includes diode means.

4. A system according to claim 3 wherein said diode means is a plurality of diodes.

5. A system for controlling temperature at a first location from a remotely located second location utilizing a source of time varying electrical energy which alternates between two directions of current flow and two conductors extending from said first location to said second location comprising:

a first system portion located at said first location including temperature responsive means for responding to the temperature at said first location and a heat source in heat transfer relationship with said temperature responsive means for heating said temperature responsive means;

a second system portion including control means for said heat source and a temperature control means for controlling the temperature at said first location; and steering circuitry means for receiving said time varying electrical energy and for connecting said heat source control means to said heat source and said temperature responsive means to said temperature control means through said two conductors, said steering circuitry means including current directing means for directing current in one direction through said heat source control means and said heat source and for directing current in the other direction through said temperature control means and said temperature responsive means for providing independent control of said heat source by said heat source control means and said temperature control means by said temperature responsive means, said current directing means causing current in said one direction to bypass said temperature control means and said temperature responsive means and current in said other direction to bypass said heat source control means and said heat source.

6. A system according to claim 5 wherein said current directing means includes a first diode connected in parallel with said temperature control means to bypass said current in said one direction, a second diode connected in parallel with said temperature responsive means to bypass said current in said one direction, a third diode connected in parallel with said heat source control means to bypass said current in said other direction, and a fourth diode connected in parallel with said heat source to bypass said current in said other direction.

7. A system according to claim 6 wherein said first and second diodes are connected in series with said heat source control means and said heat source to direct current in said one direction through said heat source control means and said heat source, and said third and fourth diodes are connected in series with said temperature control means and said temperature responsive means to direct current in said other direction through said temperature control means and said temperature responsive means.

8. A system according to claim 1 wherein said heat source control means includes means for activating said heat source control means for a predetermined period.

9. A system according to claim 8 wherein said means for activating said heat source control means includes a timing means with a switch operated by said timing means for connecting said heat source control means to said heat source during said predetermined period.

10. A system according to claim 1 wherein said heat source control means includes a variable resistor for adjusting the magnitude of current through said heat source thereby adjusting the heat output of said heat source.

11. A system according to claim 1 wherein said heat source is an incandescent lamp.

12. A system for controlling temperature at a first location from a remotely located second location utilizing a source of time varying electrical energy which alternates between two directions of current flow and two conductors extending from said first location to said second location comprising:

a first system portion located at said first location including temperature responsive means for responding to the temperature at said first location for providing control of temperature at said first location at a first temperature level and additional means for providing control of temperature at said first location at a second temperature level;

a second system portion at said second location for controlling the temperature at said first location; and steering circuitry means for receiving said time varying electrical energy and for connecting said temperature responsive means and said additional means to said second system portion through said two conductors, said steering circuitry means including directing means for directing current in one direction through said temperature responsive means and said second system portion and for directing current in the other direction through said additional means and said second system portion for providing independent control of said temperature at said first location by said temperature responsive means and said additional means through said second system portion, said directing means causing current in said one direction to bypass said additional means and current in said other direction to bypass said temperature responsive means.

13. A system according to claim 12 wherein said second system portion includes a first control means cooperative with said temperature responsive means for controlling the temperature at said first location at said first level and second control means cooperative with said additional means for controlling the temperature at said first location at said second temperature level, said steering circuitry means connecting said first control means to said temperature responsive means and said second control means to said additional means so as to direct current in one direction through said temperature responsive means and said first control means and to direct current in the other direction through said additional means and said second control means for providing independent control of said temperature responsive means by said first control means and said additional means through said second control means, said directing means causing current in said one direction to bypass said second control means and current in said other direction to bypass said temperature responsive means.

14. A system according to claim 12 wherein said directing means includes diode means.

15. A system according to claim 14 wherein said diode means is a plurality of diodes.

16. A system according to claim 13 wherein said directing means includes a first diode connected in parallel with said first control means to bypass said current in said other direction, a second diode connected in parallel with said temperature responsive means to bypass said current in said other direction, a third diode connected in parallel with said second control means to bypass said current in said one direction, and a fourth diode connected in parallel with said additional means to bypass said current in said one direction.

17. A system according to claim 16 wherein said first and second diodes are connected in series with said second control means and said additional means to direct current in said other direction through said second control means and said additional means, and said third and fourth diodes are connected in series with said first control means and said temperature responsive means to direct current in said one direction through said first control means and said temperature responsive means.

18. A system according to claim 13 wherein said second control means includes means for activating said second control means for a predetermined period.

19. A system according to claim 18 wherein said means for activating said second control means includes a timing means with a switch operated by said timing means for connecting said second control means to said additional means during said predetermined period.

* * * * *